(12) United States Patent
Yang et al.

(10) Patent No.: US 12,372,434 B2
(45) Date of Patent: Jul. 29, 2025

(54) DETERMINATION METHOD AND APPARATUS OF MAIN SHAFT BEARING STATE, ELECTRONIC DEVICE, AND STORAGE MEDIUM

(71) Applicant: CSG POWER GENERATION CO., LTD. MAINTENANCE AND TEST COMPANY, Guangzhou (CN)

(72) Inventors: Mingxuan Yang, Guangzhou (CN); Yu Gong, Guangzhou (CN); Xuan Liu, Guangzhou (CN); Yaxiong Yu, Guangzhou (CN); Qing Li, Guangzhou (CN); Xiaobo Qiu, Guangzhou (CN); Bo Wan, Guangzhou (CN); Kaiwei Xu, Guangzhou (CN); Jialiang Yu, Guangzhou (CN); Weiwei Peng, Guangzhou (CN); Jun Pei, Guangzhou (CN); Yunyun Chen, Guangzhou (CN); Hanqiu Yan, Guangzhou (CN); Yequan Liang, Guangzhou (CN); Yu Cui, Guangzhou (CN); Shusheng Luo, Guangzhou (CN); Wenxing Hu, Guangzhou (CN); Li Ye, Guangzhou (CN); Zhijia Zhai, Guangzhou (CN); Huan Liu, Guangzhou (CN)

(73) Assignee: CSG POWER GENERATION CO., LTD. MAINTENANCE AND TEST COMPANY, Guangzhou (CN)

( * ) Notice: Subject to any disclaimer, the term of this patent is extended or adjusted under 35 U.S.C. 154(b) by 0 days.

(21) Appl. No.: 18/550,023

(22) PCT Filed: Oct. 27, 2022

(86) PCT No.: PCT/CN2022/127830
§ 371 (c)(1),
(2) Date: Sep. 11, 2023

(87) PCT Pub. No.: WO2024/065924
PCT Pub. Date: Apr. 4, 2024

(65) Prior Publication Data
US 2024/0264040 A1    Aug. 8, 2024

(30) Foreign Application Priority Data
Sep. 29, 2022  (CN) .......................... 202211218736.7

(51) Int. Cl.
*G01M 13/04*   (2019.01)
(52) U.S. Cl.
CPC .................................. *G01M 13/04* (2013.01)
(58) Field of Classification Search
None
See application file for complete search history.

(56) References Cited

U.S. PATENT DOCUMENTS

| | | | | |
|---|---|---|---|---|
| 2015/0116131 | A1* | 4/2015 | Ikeda | G05B 23/0235 340/870.07 |
| 2016/0187226 | A1* | 6/2016 | Tsutsui | G01M 13/045 73/593 |

FOREIGN PATENT DOCUMENTS

| | | | | |
|---|---|---|---|---|
| CN | 113217257 A | * | 8/2021 | ............ F03B 11/008 |
| CN | 113239613 A | | 8/2021 | |

(Continued)

OTHER PUBLICATIONS

Liu, et. al., Effects Analysis Based on Computer Simulation of Autonomous Underwater Vehicle Throw Limiting Period on Initial Trajectory, Fourth International Conference on Computational and Information Sciences, 2012, pp. 62-64, IEEE, Conference Publishing Services, China, DOI 10.1109/ICCIS.2012.139, 978-0-7695-4789-3/12.

(Continued)

*Primary Examiner* — Michael J Dalbo
*Assistant Examiner* — Denise R Karavias
(74) *Attorney, Agent, or Firm* — BOND, SCHOENECK & KING, PLLC; George R. McGuire

(57) ABSTRACT

Provided are a determination method and apparatus of a main shaft bearing state, an electronic device, and a storage medium. The method includes the following steps: Bearing swing data of a target main shaft bearing at multiple (Continued)

moments within a preset time period are acquired; at least one current data period and current-period bearing swing data in each current data period are determined according to the multiple pieces of bearing swing data; a first abrupt change value and a second abrupt change value are determined according to the current-period bearing swing data in each current data period; and a main shaft bearing state of the target main shaft bearing is determined according to the first abrupt change value and the second abrupt change value.

15 Claims, 5 Drawing Sheets

(56) References Cited

FOREIGN PATENT DOCUMENTS

| CN | 113269456 A | * | 8/2021 |
| CN | 114817842 A | | 7/2022 |
| JP | 2022129900 A | * | 9/2022 |

OTHER PUBLICATIONS

Translation of OA1 of CN prior application, App. No. 202111284651. 4, dated Dec. 20, 2015, pp. 1-13.

Zhang, et. al., Shaft run-out's peak-to-peak value calculation method for a hydraulic power unit under stable conditions, Journal of Vibration and Shock, 2015, vol. 34—No. 21, China Academic Journal Electronic Publishing House, China, http:///www.cnki.net, CLC No. TH113.2; TK730 . . . 7 Document code: A, DOI: 10.13465/j.cnki.jvs.2015.21.029.

International Search Report with original Written Opinion, App. No. PCT/CN2022/127843, dated Dec. 15, 2022, pp. 1-8.

* cited by examiner

DETERMINATION METHOD AND APPARATUS OF MAIN SHAFT BEARING STATE, ELECTRONIC DEVICE, AND STORAGE MEDIUM

CROSS-REFERENCE TO RELATED APPLICATIONS

This is a National Stage Application, filed under 35 U.S.C. 371, of International Patent Application No. PCT/CN2022/127830, filed on Oct. 27, 2022, which claims priority to Chinese Patent Application No. 202211218736.7 filed with the China National Intellectual Property Administration (CNIPA) on Sep. 29, 2022, the disclosures of which are incorporated herein by reference in their entireties.

TECHNICAL FIELD

Embodiments of the present application relate to the field of computer technology, for example, a determination method and apparatus of a main shaft bearing state, an electronic device, and a storage medium.

BACKGROUND

With the development of power systems, requirements for the operation reliability of generator sets are increasingly high. Therefore, online monitoring and fault diagnosis on generator sets have become one of the research hotspots in power system production and research departments. A high-performance computer is used for performing online monitoring on the real-time state of a generator set. In this case, operation parameters and the current working condition of the generator set can be known timely, so as to discover an accident hazard timely. Moreover, alarm monitoring and post disturbance review can be performed. Further, a large amount of abnormal information can be stored at high speed and instantaneously, facilitating accident analysis.

If the generator set operates in an abnormal bearing state for a long time, structural components of the generator set may suffer unpredictable damage, and other accidents may also be induced. For example, shafting faults such as an imbalance in a rotary component, the out-of-straight axis of a large shaft, the misalignment of the large shaft, and oil film whirling may cause the generator set to vibrate violently, causing some components to be damaged, worsening operating conditions of the generator set, and seriously affecting the stability of the generator set.

However, in the related art, the determination method of a main shaft bearing state is generally dependent on the operating staff. The sensory judgment is carried out through an orbit graph of the shaft center, which cannot manifest the operation of the main shaft bearing of the generator set accurately and quantitatively. Moreover, a systematic and operable determination method is difficult to form, leading to the device damage caused by an inaccurate determination of the main shaft bearing state of the generator set and a delayed discovery of abnormity, thereby endangering safe production.

SUMMARY

Embodiments of the present application provide a determination method and apparatus of a main shaft bearing state, an electronic device, and a storage medium to determine the main shaft bearing state accurately and timely, thereby improving the stability of a generator set.

According to the present application, a determination method of a main shaft bearing state is provided. The method includes the steps described below.

Bearing swing data of a target main shaft bearing at multiple moments within a preset time period are acquired.

At least one current data period and current-period bearing swing data in each current data period are determined according to multiple pieces of bearing swing data.

A first abrupt change value and a second abrupt change value are determined according to the current-period bearing swing data in each current data period.

A main shaft bearing state of the target main shaft bearing is determined according to the first abrupt change value and the second abrupt change value.

The first abrupt change value is an abrupt change value between different current-period bearing swing data in each current data period. The second abrupt change value is an abrupt change value between current-period bearing swing data in different current data periods.

According to the present application, a determination apparatus of a main shaft bearing state is provided. The apparatus includes a bearing swing data acquisition module, a current-period bearing swing data determination module, an abrupt change value determination module, and a main shaft bearing state determination module.

The bearing swing data acquisition module is configured to acquire bearing swing data of a target main shaft bearing at multiple moments within a preset time period.

The current-period bearing swing data determination module is configured to determine at least one current data period and current-period bearing swing data in each current data period according to multiple bearing swing data.

The abrupt change value determination module is configured to determine a first abrupt change value and a second abrupt change value according to the current-period bearing swing data in each current data period.

The main shaft bearing state determination module is configured to determine a main shaft bearing state of the target main shaft bearing according to the first abrupt change value and the second abrupt change value.

The first abrupt change value is an abrupt change value between different current-period bearing swing data in each current data period. The second abrupt change value is an abrupt change value between current-period bearing swing data in different current data periods.

According to the present application, an electronic device is provided. The electronic device includes at least one processor and a memory communicatively connected to the at least one processor.

The memory stores computer instructions executable by the at least one processor. The computer instructions are executed by the at least one processor to cause the at least one processor to perform the determination method of a main shaft bearing state according to any embodiment of the present application.

According to the present application, a computer-readable storage medium is provided. The computer-readable storage medium stores computer instructions. The computer instructions, when executed by a processor, are configured to implement the determination method of a main shaft bearing state according to any embodiment of the present application.

DETAILED DESCRIPTION

It is to be noted that the terms "first", "second" and the like in the description, claims and drawings of the present application are used to distinguish between similar objects and are not necessarily used to describe a particular order or sequence. It should be understood that the data used in this way is interchangeable where appropriate so that embodiments of the present application described herein may also be implemented in a sequence not illustrated or described herein. In addition, the terms "comprising", "having" or any other variations thereof herein are intended to encompass a non-exclusive inclusion. For example, a process, method, system, product or device that includes a series of steps or elements not only includes the expressly listed steps or elements but may also include other steps or elements that are not expressly listed or are inherent to such process, method, system, product or device.

Figure 1:
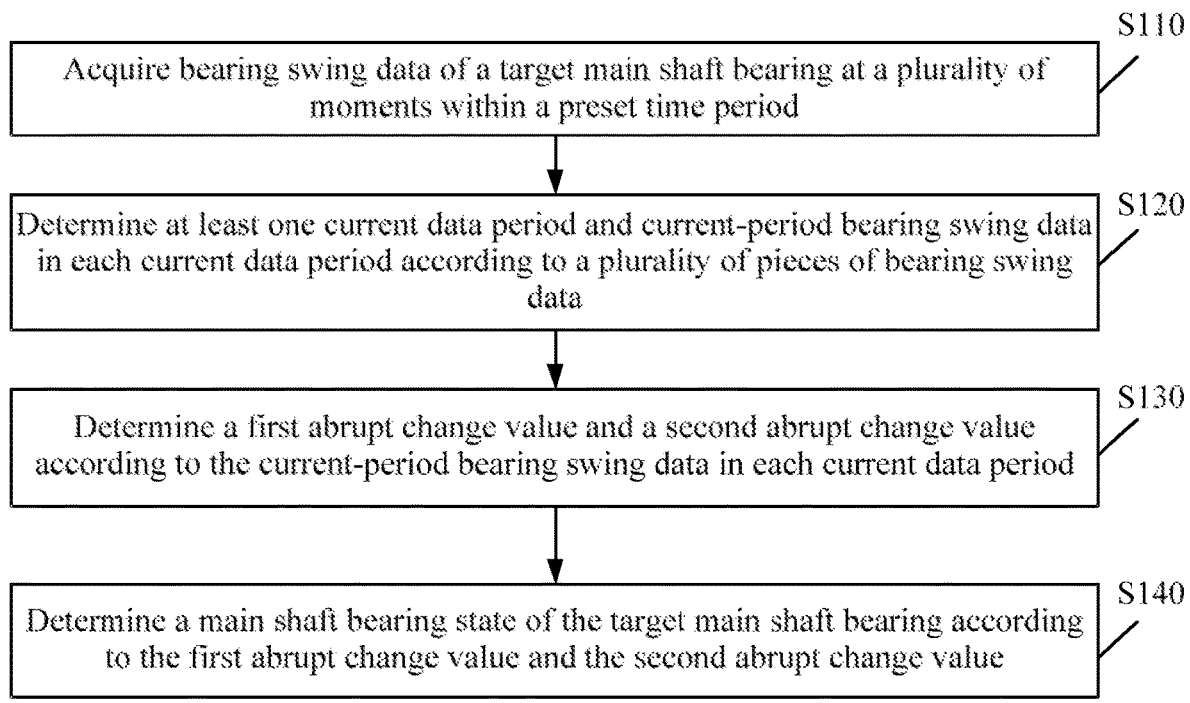
FIG. 1 is a flowchart of a determination method of a main shaft bearing state according to an embodiment of the present application.

FIG. 1 is a flowchart of a determination method of a main shaft bearing state according to an embodiment of the present application. This embodiment is applicable to a case of determining the main shaft bearing state accurately and timely. The method may be performed by a determination apparatus of a main shaft bearing state. The apparatus may be implemented by software and/or hardware and may be generally integrated into an electronic device in this method. The electronic device may be a terminal device or a server device. This embodiment of the present application does not limit the type of the electronic device performing the determination method of a main shaft bearing state. For example, as shown in FIG. 1, the determination method of a main shaft bearing state may include the following steps:

In S110, bearing swing data of a target main shaft bearing at a plurality of moments within a preset time period are acquired.

The target main shaft bearing may be any main shaft bearing whose state needs to be determined, for example, a main shaft upper guide bearing or a main shaft lower guide bearing, which is not limited in the embodiments of the present application. The preset time period may be a time period that is preset. The bearing swing data may be swing data generated in a swing process of the bearing.

In the embodiments of the present application, the bearing swing data of the target main shaft bearing at multiple moments within the preset time period are acquired. It is to be understood that the preset time period may be set according to actual needs. In the preset time period, each moment may have corresponding bearing swing data.

In S120, at least one current data period and current-period bearing swing data in each current data period are determined according to multiple pieces of bearing swing data.

A current data period may be one period constituted by bearing swing data at multiple continuous moments within the preset time period. It is to be understood that one or more current data periods may be provided, which is not limited in the embodiments of the present application. Illustratively, it is assumed that bearing swing data from the 1st moment to the 50th moment are acquired. The 1st moment to the 50th moment may be determined as a current data period. In this case, only one current data period is provided. Alternatively, the 1st moment to the 25th moment may be determined as a current data period, and the 26th moment to the 50th moment may be determined as the next current data period. In this case, multiple current data periods are provided. The current-period bearing swing data may be bearing swing data in the current data period. Illustratively, it is assumed that bearing swing data from the 1st moment to the 50th moment are acquired and that the 1st moment to the 25th moment may be determined as the current data period. In this case, bearing swing data corresponding to the 1st moment to the 25th moment may be determined as the current-period bearing swing data.

In the embodiments of the present application, after the bearing swing data of the target main shaft bearing at multiple moments within the preset time period are acquired, the at least one current data period and the current-period bearing swing data in each current data period may be determined according to the multiple pieces of bearing swing data. It is to be understood that when multiple current data periods are provided, the current-period bearing swing data in each current data period has the same quantity.

In S130, a first abrupt change value and a second abrupt change value are determined according to the current-period bearing swing data in each current data period.

The first abrupt change value may be an abrupt change value between different current-period bearing swing data in each current data period. The second abrupt change value may be an abrupt change value between current-period bearing swing data in different current data periods.

In the embodiments of the present application, after the at least one current data period and the current-period bearing swing data in each current data period are determined according to the multiple pieces of bearing swing data, the first abrupt change value and the second abrupt change value may be determined according to the current-period bearing swing data in each current data period.

In S140, a main shaft bearing state of the target main shaft bearing is determined according to the first abrupt change value and the second abrupt change value.

In the embodiments of the present application, after the first abrupt change value and the second abrupt change value are determined according to the current-period bearing swing data in each current data period, the main shaft bearing state of the target main shaft bearing may be determined according to the first abrupt change value and the second abrupt change value. It is to be understood that the main shaft bearing state may be a state of the normal adjustment of a bearing gap, a state of the excessively-large adjustment of the bearing gap, a state of the excessively-small adjustment of the bearing gap, or a state of the uneven adjustment of the bearing gap, which is not limited in the embodiments of the present application.

For the technical schemes in this embodiment, the bearing swing data of the target main shaft bearing at the plurality of moments within the preset time period are acquired. The at least one current data period and the current-period bearing swing data in each current data period are determined according to the plurality of pieces of bearing swing data. In this case, the first abrupt change value and the second abrupt change value are determined according to the current-period bearing swing data in each current data period. Therefore, the main shaft bearing state of the target main shaft bearing is determined according to the first abrupt change value and the second abrupt change value, avoiding the case of an inaccurate determination of the main shaft bearing state and a delayed discovery of abnormity in the related art, enabling the main shaft bearing state to be determined accurately and timely, and thereby improving the stability of a generator set.

Figure 2:
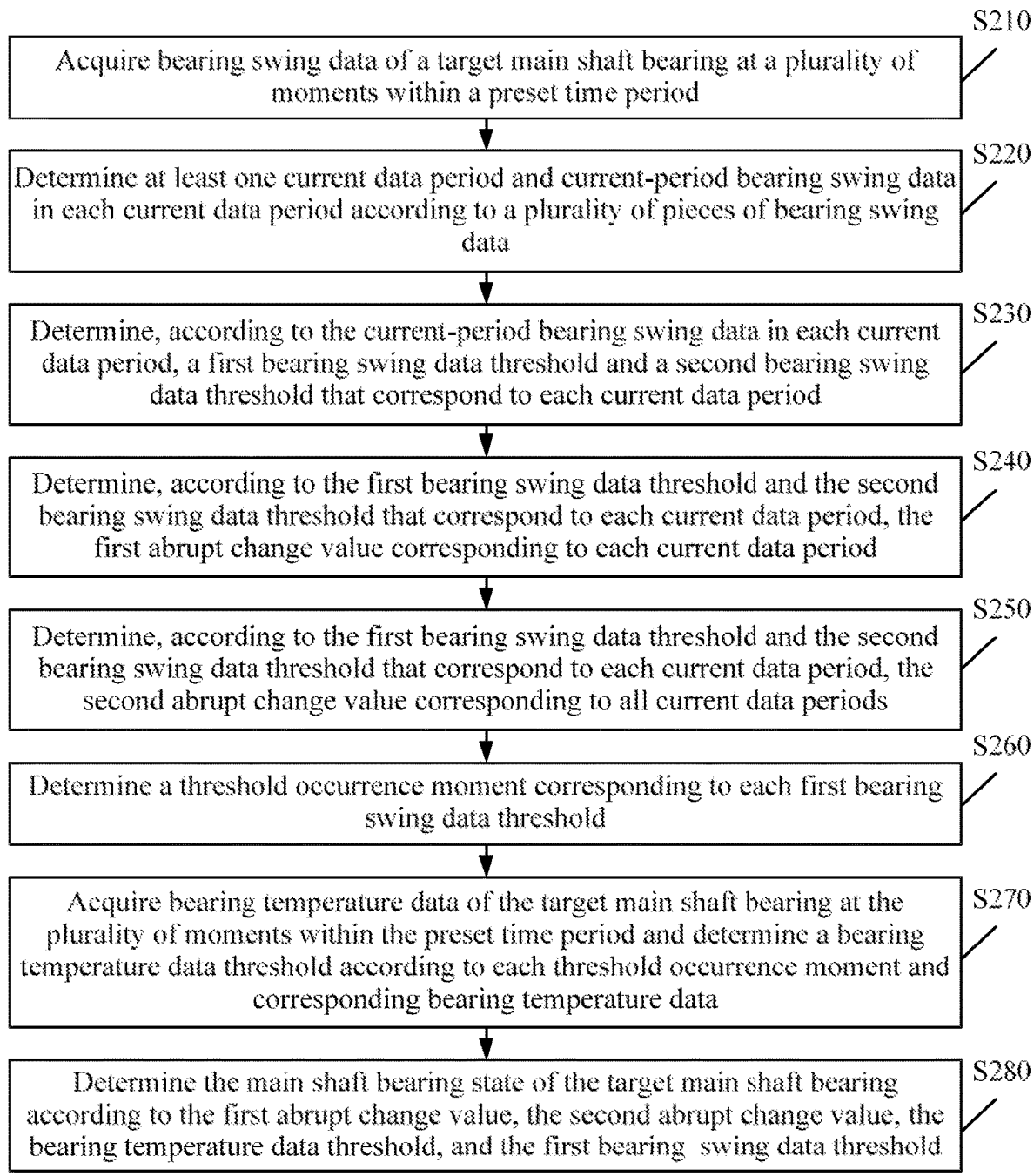
FIG. 2 is a flowchart of a determination method of a main shaft bearing state according to another embodiment of the present application.

FIG. 2 is a flowchart of a determination method of a main shaft bearing state according to another embodiment of the present application. As a refinement of the preceding technical scheme, this embodiment provides the implementation of multiple examples in which the first abrupt change value and the second abrupt change value are determined according to the current-period bearing swing data in each current data period and the main shaft bearing state of the target main shaft bearing is determined according to the first abrupt change value and the second abrupt change value. The technical scheme in this embodiment may be combined with multiple example schemes in the one or more preceding embodiments. As shown in FIG. 2, the method may include the steps described below.

In S210, bearing swing data of a target main shaft bearing at a plurality of moments within a preset time period are acquired.

In S220, at least one current data period and current-period bearing swing data in each current data period are determined according to the multiple pieces of bearing swing data.

In S230, a first bearing swing data threshold and a second bearing swing data threshold that correspond to each current data period are determined according to the current-period bearing swing data in each current data period.

The first bearing swing data threshold may be the maximum value in the current-period bearing swing data. The second bearing swing data threshold may be the minimum value in the current-period bearing swing data.

In this embodiment of the present application, after the at least one current data period and the current-period bearing swing data in each current data period are determined according to multiple bearing swing data, the first bearing swing data threshold and the second bearing swing data threshold that correspond to each current data period may be determined according to the current-period bearing swing data in each current data period. It is to be understood that each current data period may have one first bearing swing data threshold and one second bearing swing data threshold.

In S240, a first abrupt change value corresponding to each current data period is determined according to the first bearing swing data threshold and the second bearing swing data threshold that correspond to each current data period.

In this embodiment of the present application, after the first bearing swing data threshold and the second bearing swing data threshold that correspond to each current data period are determined according to the current-period bearing swing data in each current data period, the first abrupt change value corresponding to each current data period may be determined according to the first bearing swing data threshold and the second bearing swing data threshold that correspond to each current data period. It is to be understood that the number of first abrupt change values may be the same as the number of current data periods. That is, one current data period corresponds to one first abrupt change value.

For example, the step in which the first abrupt change value corresponding to each current data period is determined according to the first bearing swing data threshold and the second bearing swing data threshold that correspond to each current data period may include the following: A current first threshold moment corresponding to the first bearing swing data threshold in the current data period is determined; in a case where the current first threshold moment meets a current first preset condition, first abrupt change value calculation data is determined, and the first abrupt change value corresponding to the current data period is determined according to the first abrupt change value calculation data; in a case where the current first threshold moment does not meet the current first preset condition, a current second threshold moment corresponding to the second bearing swing data threshold in the current data period is determined; and in a case where the current second threshold moment meets a current second preset condition, second abrupt change value calculation data is determined, and the first abrupt change value corresponding to the current data period is determined according to the second abrupt change value calculation data.

The current first preset condition may be determined according to the current data period, the current first threshold moment, and the data quantity of the current-period bearing swing data in the current data period. The current second preset condition may be determined according to the current data period, the current second threshold moment, and the data quantity of the current-period bearing swing data in the current data period.

The current first threshold moment may be a moment corresponding to the first bearing swing data threshold, that is, the moment when the maximum value in the current data period occurs. The current first preset condition may be a preset condition corresponding to the current first threshold moment. The first abrupt change value calculation data may be data capable of calculating the first abrupt change value. The current second threshold moment may be a moment corresponding to the second bearing swing data threshold, that is, the moment when the minimum value in the current data period occurs. The current second preset condition may be a preset condition corresponding to the current second threshold moment. The second abrupt change value calculation data may be data capable of calculating the second abrupt change value.

For example, after the first bearing swing data threshold and the second bearing swing data threshold that correspond to each current data period are determined according to the current-period bearing swing data in each current data period, the current first threshold moment corresponding to the first bearing swing data threshold in the current data period may be determined. Moreover, it is judged whether the current first threshold moment meets the current first preset condition. If the current first threshold moment meets the current first preset condition, the first abrupt change value calculation data is determined so as to determine the first abrupt change value according to the first abrupt change value calculation data. If the current first threshold moment does not meet the current first preset condition, the current second threshold moment corresponding to the second bearing swing data threshold in the current data period is determined so as to determine whether the current second threshold moment meets the current second preset condition. If the current second threshold moment meets the current second preset condition, the second abrupt change value calculation data is determined so as to determine the first abrupt change value according to the second abrupt change value calculation data. It is to be understood that if the current second threshold moment does not meet the current second preset condition, it indicates that the acquisition of the bearing swing data is abnormal. In this case, the prompt information "Data collection error, please check" may be output.

For example, the current first preset condition may be determined based on the following formula:

$$8*i < Ai < (x-8)*i$$

i denotes an $i^{th}$ current data period. Ai denotes the current first threshold moment. x denotes the data quantity of the current-period bearing swing data in the current data period.

For example, the current second preset condition may be determined based on the following formula:

$$8*i < Bi < (x-8)*i$$

Bi denotes the current second threshold moment.

For example, the first abrupt change value corresponding to the current data period is determined according to the first abrupt change value calculation data. The first abrupt change value may be determined based on the following formula:

$$SV_i = |X_i - X_{i*x}| + \|X_{Ai} - X_{Ai-4}\| - |X_{Ai} - X_{Ai+4}\| + \|X_{Ai-4} - X_{Ai-8}\| - |X_{Ai+4} - X_{Ai+8}\|$$

$SV_i$ denotes the first abrupt change value. $X_i$ denotes bearing swing data at an $i^{th}$ moment. $X_{i*x}$ denotes bearing swing data at an $(i*x)^{th}$ moment. $X_{Ai}$ denotes bearing swing data at an $Ai^{th}$ moment, that is, the first bearing swing data threshold. $X_{Ai-4}$ denotes bearing swing data at an $(Ai-4)^{th}$ moment. $X_{Ai+4}$ denotes bearing swing data at an $(Ai+4)^{th}$ moment. $X_{Ai-8}$ denotes bearing swing data at an $(Ai-8)^{th}$ moment. $X_{Ai+8}$ denotes bearing swing data at an $(Ai+8)^{th}$ moment.

For example, the first abrupt change value corresponding to the current data period is determined according to the second abrupt change value calculation data. The first abrupt change value may be determined based on the following formula:

$$SV_i = |X_i - X_{i*x}| + \|X_{Bi} - X_{Bi-4}\| - |X_{Bi} - X_{Bi+4}\| + \|X_{Bi-4} - X_{Bi-8}\| - |X_{Bi+4} - X_{Bi+8}\|$$

$X_{Bi}$ denotes bearing swing data at a $Bi^{th}$ moment, that is, the second bearing swing data threshold. $X_{Bi-4}$ denotes bearing swing data at a $(Bi-4)^{th}$ moment. $X_{Bi+4}$ denotes bearing swing data at a $(Bi+4)^{th}$ moment. $X_{Bi-8}$ denotes bearing swing data at a $(Bi-8)^{th}$ moment. $X_{Bi+8}$ denotes bearing swing data at a $(Bi+8)^{th}$ moment.

In S250, a second abrupt change value corresponding to all current data periods is determined according to the first bearing swing data threshold and the second bearing swing data threshold that correspond to each current data period.

In the embodiments of the present application, after the first bearing swing data threshold and the second bearing swing data threshold that correspond to each current data period are determined according to the current-period bearing swing data in each current data period, the second abrupt change value corresponding to all current data periods may be determined according to the first bearing swing data threshold and the second bearing swing data threshold that correspond to each current data period. It is to be understood that one second abrupt change value may be provided. That is, all current data periods correspond to one second abrupt change value.

It is to be noted that FIG. 2 is merely a diagram of one implementation manner. Steps S240 and S250 are not in sequence. Step S240 may be performed first, and then step S250 is performed. Alternatively, step S250 may be performed first, and then step S240 is performed. Alternatively, the two steps may be performed in parallel or one of them is performed.

For example, the step in which the second abrupt change value corresponding to all current data periods is determined according to the first bearing swing data threshold and the second bearing swing data threshold that correspond to each current data period may include the following: The total period number of current data periods is determined, and the second abrupt change value corresponding to all current data periods is determined according to the total period number of current data periods as well as the first bearing swing data threshold and the second bearing swing data threshold that correspond to each current data period.

The total period number may be the total number of all current data periods. Illustratively, if five current data periods are provided, the total period number is five.

For example, after the first bearing swing data threshold and the second bearing swing data threshold that correspond to each current data period are determined according to the current-period bearing swing data in each current data period, the total period number of current data periods may be determined so that the second abrupt change value corresponding to all current data periods is determined according to the total period number of current data periods as well as the first bearing swing data threshold and the second bearing swing data threshold that correspond to each current data period.

For example, the second abrupt change value corresponding to all current data periods is determined according to the total period number of current data periods as well as the first bearing swing data threshold and the second bearing swing data threshold that correspond to each current data period. The second abrupt change value corresponding to all current data periods may be determined based on the following formula:

$$CV = \sqrt{\frac{\sum_{i=1}^{m}\left(X_{Ai} - \frac{\sum_{i}^{m} X_{Ai}}{m}\right)^2 + \sum_{i=1}^{m}\left(X_{Bi} - \frac{\sum_{i}^{m} X_{Bi}}{m}\right)^2}{2m}}.$$

CV denotes the second abrupt change value, and m denotes the total period number.

In S260, a threshold occurrence moment corresponding to each first bearing swing data threshold is determined.

In S270, bearing temperature data of the target main shaft bearing at the multiple moments within the preset time period are acquired, and a bearing temperature data threshold is determined according to each threshold occurrence moment and the corresponding bearing temperature data.

A threshold occurrence moment may be the moment when the first bearing swing data threshold occurs in the current-period bearing swing data. The bearing temperature data may be temperature data of the bearing. The bearing temperature data threshold may be bearing temperature data corresponding to the moment when the first bearing swing data threshold occurs in the current-period bearing swing data. It is to be understood that bearing temperature data thresholds correspond to threshold occurrence moments in a one-to-one manner. That is, each threshold occurrence moment corresponds to one bearing temperature data threshold. Therefore, one or more bearing temperature data thresholds may be provided, which is not limited in the embodiments of the present application.

In the embodiments of the present application, the threshold occurrence moment corresponding to each first bearing swing data threshold is determined. Moreover, the bearing temperature data of the target main shaft bearing at the plurality of moments within the preset time period are acquired so that the bearing temperature data threshold is determined according to each threshold occurrence moment and the corresponding bearing temperature data.

It is to be noted that FIG. 2 is merely a diagram of one implementation manner. Steps S240-S250 and steps S260-S270 are not in sequence. Steps S240-S250 may be performed first, and then steps S260-S270 are performed. Alternatively, steps S260-S270 may be performed first, and then steps S240-S250 are performed. Alternatively, both may be performed in parallel, or steps S240-S250 or steps S260-S270 are performed.

In S280, the main shaft bearing state of the target main shaft bearing is determined according to the first abrupt change value, the second abrupt change value, the bearing temperature data threshold, and the first bearing swing data threshold.

In this embodiment of the present application, the main shaft bearing state of the target main shaft bearing may be determined according to the first abrupt change value, the second abrupt change value, the bearing temperature data threshold, and the first bearing swing data threshold.

For example, the step in which the main shaft bearing state of the target main shaft bearing is determined according to the first abrupt change value, the second abrupt change value, the bearing temperature data threshold, and the first bearing swing data threshold may include the following: In a case of determining that the first abrupt change value meets a first abrupt change value preset threshold, a first preset threshold is determined, and the main shaft bearing state of the target main shaft bearing is determined according to the bearing temperature data threshold, the first bearing swing data threshold, and the first preset threshold; and in a case of determining that the first abrupt change value does not meet the first abrupt change value preset threshold and that the second abrupt change value meets a second abrupt change value preset threshold, a second preset threshold is determined, and the main shaft bearing state of the target main shaft bearing is determined according to the bearing temperature data threshold, the first bearing swing data threshold, and the second preset threshold.

The first abrupt change value preset threshold may be a preset threshold corresponding to the first abrupt change value. The first preset threshold may be a preset threshold capable of determining the main shaft bearing state of the target main shaft bearing. The second abrupt change value preset threshold may be a preset threshold corresponding to the second abrupt change value. The second preset threshold may be another preset threshold capable of determining the main shaft bearing state of the target main shaft bearing.

For example, it is judged whether the first abrupt change value meets the first abrupt change value preset threshold. If the first abrupt change value meets the first abrupt change value preset threshold, the first preset threshold may be determined so as to determine the main shaft bearing state of the target main shaft bearing according to the bearing temperature data threshold, the first bearing swing data threshold, and the first preset threshold.

For example, if the first abrupt change value does not meet the first abrupt change value preset threshold, it may be judged whether the second abrupt change value meets the second abrupt change value preset threshold. If the second abrupt change value meets the second abrupt change value preset threshold, the second preset threshold may be determined so as to determine the main shaft bearing state of the target main shaft bearing according to the bearing temperature data threshold, the first bearing swing data threshold, and the second preset threshold.

For example, the method may further include the following: In a case of determining that the first abrupt change value does not meet the first abrupt change value preset threshold and that the second abrupt change value does not meet the second abrupt change value preset threshold, it is determined that the main shaft bearing state of the target main shaft bearing is the state of the uneven adjustment of the bearing gap.

For example, if the first abrupt change value does not meet the first abrupt change value preset threshold and the second abrupt change value does not meet the second abrupt change value preset threshold, it may be determined that the main shaft bearing state of the target main shaft bearing is the state of the uneven adjustment of the bearing gap.

For example, the first preset threshold may include a first preset threshold condition of bearing temperature data and a first preset threshold of bearing swing data. The step in which the main shaft bearing state of the target main shaft bearing is determined according to the bearing temperature data threshold, the first bearing swing data threshold, and the first preset threshold may include the following: In a case of determining that the bearing temperature data threshold meets the first preset threshold condition of bearing temperature data and that the first bearing swing data threshold meets the first preset threshold of bearing swing data, it is determined that the main shaft bearing state of the target main shaft bearing is the state of the normal adjustment of the bearing gap; and in a case of determining that the bearing temperature data threshold does not meet the first preset threshold condition of bearing temperature data or that the first bearing swing data threshold does not meet the first preset threshold of bearing swing data, it is determined that the main shaft bearing state of the target main shaft bearing is the state of the excessively-large adjustment of the bearing gap.

The first preset threshold condition of bearing temperature data may be a preset threshold condition of bearing temperature data. The first preset threshold of bearing swing data may be a preset threshold of bearing swing data.

For example, when the first preset threshold includes the first preset threshold condition of bearing temperature data and the first preset threshold of bearing swing data, it is judged whether the bearing temperature data threshold meets the first preset threshold condition of bearing temperature data and whether the first bearing swing data threshold meets the first preset threshold of bearing swing data. If the bearing temperature data threshold meets the first preset threshold condition of bearing temperature data and the first bearing swing data threshold meets the first preset threshold of bearing swing data, it may be determined that the main shaft bearing state of the target main shaft bearing is the state of the normal adjustment of the bearing gap. If the bearing temperature data threshold does not meet the first preset threshold condition of bearing temperature data or the first bearing swing data threshold does not meet the first preset threshold of bearing swing data, it may be determined that the main shaft bearing state of the target main shaft bearing is the state of the excessively-large adjustment of the bearing gap.

For example, the first preset threshold condition of bearing temperature data may be determined based on the formula below.

$$(\sigma - 1) < W_{Xt} < (\sigma + 1)$$

$W_{Xt}$ denotes the bearing temperature data threshold. $\sigma$ denotes the set threshold for main shaft bearing temperature data.

For example, the second preset threshold may include a second preset threshold condition of bearing temperature data and a second preset threshold of bearing swing data. The step in which the main shaft bearing state of the target main shaft bearing is determined according to the bearing temperature data threshold, the first bearing swing data threshold, and the second preset threshold may include the following: In a case of determining that the bearing temperature data threshold meets the second preset threshold condition of bearing temperature data and that the first bearing swing data threshold meets the second preset threshold of bearing swing data, it is determined that the main shaft bearing state of the target main shaft bearing is the state of the excessively-small adjustment of the bearing gap.

The second preset threshold condition of bearing temperature data may be another preset threshold condition of bearing temperature data. The second preset threshold of bearing swing data may be another preset threshold of bearing swing data.

For example, when the second preset threshold includes the second preset threshold condition of bearing temperature data and the second preset threshold of bearing swing data, it is judged whether the bearing temperature data threshold meets the second preset threshold condition of bearing temperature data and whether the first bearing swing data threshold meets the second preset threshold of bearing swing data. If the bearing temperature data threshold meets the second preset threshold condition of bearing temperature data and the first bearing swing data threshold meets the second preset threshold of bearing swing data, it may be determined that the main shaft bearing state of the target main shaft bearing is the state of the excessively-small adjustment of the bearing gap.

For example, if the bearing temperature data threshold does not meet the second preset threshold condition of bearing temperature data or the first bearing swing data threshold does not meet the second preset threshold of bearing swing data, it indicates that data acquisition is abnormal. In this case, the prompt information "Data collection error, please check" may be output.

For example, the second preset threshold condition of bearing temperature data may be determined based on the formula below.

$$(\sigma + 1) < W_{Xt}$$

For the technical scheme in this embodiment, the bearing swing data of the target main shaft bearing at the plurality of moments within the preset time period are acquired. The at least one current data period and the current-period bearing swing data in each current data period are determined according to the multiple pieces of bearing swing data. In this case, the first bearing swing data threshold and the second bearing swing data threshold that correspond to each current data period are determined according to the current-period bearing swing data in each current data period. Thus the first abrupt change value corresponding to each current data period is determined according to each first bearing swing data threshold and each second bearing swing data threshold, and the second abrupt change value corresponding to all current data periods is determined according to the first bearing swing data threshold and the second bearing swing data threshold that correspond to each current data period. Moreover, the threshold occurrence moment corresponding to each first bearing swing data threshold is determined, and the bearing temperature data of the target main shaft bearing at the plurality of moments within the preset time period are acquired so that the bearing temperature data threshold is determined according to each threshold occurrence moment and the corresponding bearing temperature data. Therefore, the main shaft bearing state of the target main shaft bearing is determined according to the first abrupt change value, the second abrupt change value, the bearing temperature data threshold, and the first bearing swing data threshold, the case of an inaccurate determination of the main shaft bearing state and a delayed discovery of abnormity in the related art is avoided, and the main shaft bearing state can be determined accurately and timely, thereby improving the stability of a generator set.

Figure 3:
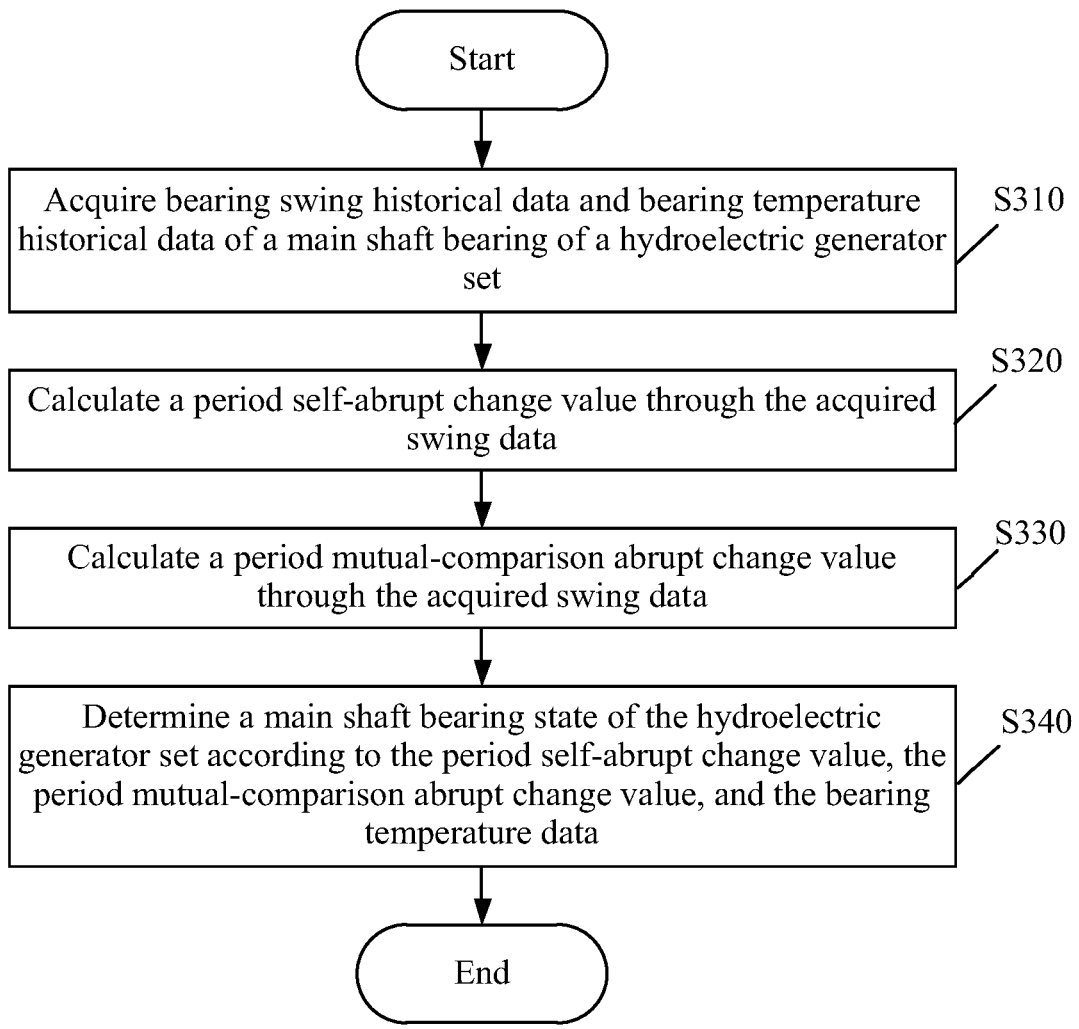
FIG. 3 is an example flowchart of a determination method of a main shaft bearing state according to an embodiment of the present application.

An embodiment of the present application makes a description by taking an application scenario of determining a main shaft bearing state of a hydroelectric generator set as an example. With an increase in the single-generator installed capacity of the hydroelectric generator set, hydropower occupies an increasingly large proportion in the power system. The power system also puts forward higher requirements for the operation reliability of hydropower to guarantee the safe and reliable operation of the generator set, reduce device maintenance costs, and improve the operation efficiency of the generator set. At present, online monitoring and fault diagnosis on hydroelectric generator sets have become one of the research hotspots in power system production and research departments. A high-performance computer is used for performing online monitoring on the real-time state of a generator set. In this case, operation parameters and current working conditions of the generator set can be known timely, thereby enabling an accident potential to be discovered timely. Moreover, alarm monitoring and post disturbance review can be performed. Further, a large amount of abnormal information can be stored at high speed and instantaneously, facilitating accident analysis. Therefore, the research on the fault diagnosis technology of the hydroelectric generator set and the intelligent diagnosis on a vibration fault of the generator set based on the related art provide great significance for improving the fault diagnosis level of the hydroelectric generator set and narrowing the gap with other similar technologies. FIG. 3 is an example flowchart of a determination method of a main shaft bearing state according to an embodiment of the present application. As shown in FIG. 3, the method includes the steps below.

In S310, bearing swing historical data and bearing temperature historical data of a main shaft bearing of a hydroelectric generator set are acquired. The bearing swing historical data of the main shaft bearing of the hydroelectric generator set may include swing data Xt of a main shaft upper guide bearing at a tth moment and swing data Yt of a main shaft lower guide bearing at the tth moment. The bearing temperature historical data of the main shaft bearing of the hydroelectric generator set may include temperature data WXt of the main shaft upper guide bearing at the tth moment and swing data WYt of the main shaft lower guide bearing at the tth moment. t may be any moment. For example, t=1, 2, . . . , n.

For example, x consecutive moments may be determined as one analysis period (that is, one current data period). Bearing swing historical data and bearing temperature historical data of the main shaft bearing of the hydroelectric generator set in m analysis periods may be acquired. Illustratively, x may be 96, and m may be 3. That is, three analysis periods may be determined. Each analysis period may include 96 pieces of bearing swing historical data and 96 pieces of bearing temperature historical data.

In S320, a period self-abrupt change value (that is, the first abrupt change value) is calculated through the acquired swing data. The period self-abrupt change value may include a period self-abrupt change value SViX of main shaft upper guide bearing swing data of the hydroelectric generator set in an ith period and a period self-abrupt change value SViY of main shaft lower guide bearing swing data of the hydroelectric generator set in the ith period.

For example, the calculation of the period self-abrupt change value SViX of main shaft upper guide bearing swing data of the hydroelectric generator set in the ith period may include the steps below.

(1) The maximum value XAi of main shaft upper guide bearing swing data in the ith period and the moment Ai when the maximum value of the main shaft upper guide bearing swing data occurs are acquired.

(2) The minimum value XBi of main shaft upper guide bearing swing data in the ith period and the moment Bi when the minimum value of the main shaft upper guide bearing swing data occurs are acquired.

(3) It is judged whether 8*i<Ai<(x−8)*i. If 8*i<Ai<(x−8)*i, step (5) is performed. Otherwise, step (4) is performed.

(4) It is judged whether 8*i<Bi<(x−8)*i. If 8*i<Bi<(x−8)*i, step (6) is performed. Otherwise, "Data abnormity, please check" is output.

(5) The period self-abrupt change value SViX of main shaft upper guide bearing swing data of the hydroelectric generator set in the ith period is calculated according to the following formula: $SV_i^X = |X_i - X_{i*x}| + \|X_{Ai} - X_{Ai} - 4| - |X_{Ai} - X_{Ai} + 4\| + \|X_{Ai} - 4 - X_{Ai} - 8| - |X_{Ai} + 4 - X_{Ai} + 8\|$.

(6) The period self-abrupt change value SViX of the ith period main shaft upper guide bearing swing data of the hydroelectric generator set is calculated according to the following formula: $SV_i^X = |X_i - X_{i*x}| + \|X_{Bi} - X_{Bi} - 4| - |X_{Bi} - X_{Bi} + 4\| + \|X_{Bi} - 4 - X_{Bi} - 8| - |X_{Bi} + 4 - X_{Bi} + 8\|$.

For example, the calculation of the period self-abrupt change value SViY of main shaft lower guide bearing swing data of the hydroelectric generator set in the ith period may include the steps below.

(1) The maximum value YAi of main shaft lower guide bearing swing data in the ith period and the moment Ai when the maximum value of the main shaft lower guide bearing swing data occurs are acquired.

(2) The minimum value YBi of main shaft lower guide bearing swing data in the $i^{th}$ period and the moment Bi when the minimum value of the main shaft lower guide bearing swing data occurs are acquired.

(3) It is judged whether 8*i<Ai<(Y−8)*i. If 8*i<Ai<(Y−8)*i, step (5) is performed. Otherwise, step (4) is performed.

(4) It is judged whether 8*i<Bi<(Y−8)*i. If 8*i<Bi<(Y−8)*i, step (6) is performed. Otherwise, "Data abnormity, please check" is output.

(5) The period self-abrupt change value $SV_i^Y$ of main shaft lower guide bearing swing data of the hydroelectric generator set in the $i^{th}$ period is calculated according to the following formula: $SV_i^X = |X_i - X_{i*x}| + \|X_{Ai} - X_{Ai} - 4| - |X_{Ai} - X_{Ai} + 4\| + \|X_{Ai} - 4 - X_{Ai} - 8| - |X_{Ai} + 4 - X_{Ai} + 8\|$.

(6) The period self-abrupt change value $SV_i^Y$ of main shaft lower guide bearing swing data of the hydroelectric generator set in the $i^{th}$ period is calculated according to the following formula: $SV_i^X = |X_i - X_{i*x}| + \|X_{Bi} - X_{Bi} - 4| - |X_{Bi} - X_{Bi} + 4\| + \|X_{Bi} - 4 - X_{Bi} - 8| - |X_{Bi} + 4 - X_{Bi} + 8\|$.

In S330, a period mutual-comparison abrupt change value (that is, the second abrupt change value) is calculated through the acquired swing data. The period mutual-comparison abrupt change value may include a period mutual-comparison abrupt change value CVX of the main shaft upper guide bearing swing data of the hydroelectric generator set and a period mutual-comparison abrupt change value CVY of the main shaft lower guide bearing swing data of the hydroelectric generator set.

For example, the calculation of the period mutual-comparison abrupt change value CVX of the main shaft upper guide bearing swing data of the hydroelectric generator set may include the following: The maximum value XAi of main shaft upper guide bearing swing data in an ith period is acquired; the minimum value XBi of the main shaft upper guide bearing swing data in the ith period is acquired; and the period mutual-comparison abrupt change value CVX of the main shaft upper guide bearing swing data of the hydroelectric generator set is calculated based on the following formula:

$$CV^X = \sqrt{\frac{\sum_{i=1}^{m}\left(X_{Ai} - \frac{\sum_{i}^{m} X_{Ai}}{m}\right)^2 + \sum_{i=1}^{m}\left(X_{Bi} - \frac{\sum_{i}^{m} X_{Bi}}{m}\right)^2}{2m}}.$$

For example, the calculation of the period mutual-comparison abrupt change value CVY of the main shaft lower guide bearing swing data of the hydroelectric generator set may include the following: The maximum value YAi of main shaft lower guide bearing swing data in an ith period is acquired; the minimum value YBi of the main shaft lower guide bearing swing data in the ith period is acquired; and the period mutual-comparison abrupt change value CVY of the main shaft lower guide bearing swing data of the hydroelectric generator set is calculated based on the following formula:

$$CV^Y = \sqrt{\frac{\sum_{i=1}^{m}\left(Y_{Ai} - \frac{\sum_{i}^{m}Y_{Ai}}{m}\right)^2 + \sum_{i=1}^{m}\left(Y_{Bi} - \frac{\sum_{i}^{m}Y_{Bi}}{m}\right)^2}{2m}}.$$

In S340, the main shaft bearing state of the hydroelectric generator set is determined according to the period self-abrupt change value, the period mutual-comparison abrupt change value, and the bearing temperature data. The main shaft bearing state of the hydroelectric generator set may include the state of the normal adjustment of the bearing gap, the state of the excessively-large adjustment of the bearing gap, the state of the excessively-small adjustment of the bearing gap, and the state of the uneven adjustment of the bearing gap. The following steps may be included.

(1) A period self-abrupt change value threshold α (that is, the first abrupt change value preset threshold) of the main shaft bearing swing of the hydroelectric generator set, a period mutual-comparison abrupt change value threshold β (that is, the second abrupt change value preset threshold) of the main shaft bearing swing of the hydroelectric generator set, a main shaft bearing temperature threshold σ of the hydroelectric generator set, a normal value ω (that is, the second preset threshold of bearing swing data) of the main shaft bearing swing of the hydroelectric generator set, and a warning value Ω (that is, the first preset threshold of bearing swing data) of the main shaft bearing swing of the hydroelectric generator set are determined. Illustratively, α may be 2 μm. β may be 20 μm. σ may be 45° C. ω may be 300 μm. Ω may be 400 μm.

(2) For the main shaft upper guide bearing of the hydroelectric generator set, it is judged whether SViX<α. If SViX<α, step (3) is performed, otherwise, step (4) is performed. For the main shaft lower guide bearing of the hydroelectric generator set, it is judged whether SViY<α. If SViY<α, step (3) is performed, otherwise, step (4) is performed.

(3) Bearing temperature data WXt and WYt at the moment Ai when the maximum value of bearing swing data occurs are determined. It is judged whether $$\begin{cases} (\sigma - 1) < W_{Xt} < (\sigma + 1) \\ X_{Ai} < \Omega \end{cases}.$$

If $$\begin{cases} (\sigma - 1) < W_{Xt} < (\sigma + 1) \\ X_{Ai} < \Omega \end{cases},$$

the main shaft upper guide bearing state of the hydroelectric generator set is determined as "Normal adjustment of the upper guide bearing gap"; otherwise, the main shaft upper guide bearing state of the hydroelectric generator set is determined as "Excessively-large adjustment of the upper guide bearing gap". It is judged whether $$\begin{cases} (\sigma - 1) < W_{Yt} < (\sigma + 1) \\ Y_{Ai} < \Omega \end{cases}.$$

If $$\begin{cases} (\sigma - 1) < W_{Yt} < (\sigma + 1) \\ Y_{Ai} < \Omega \end{cases},$$

the main shaft lower guide bearing state of the hydroelectric generator set is determined as "Normal adjustment of the lower guide bearing gap"; otherwise, the main shaft lower guide bearing state of the hydroelectric generator set is determined as "Excessively-large adjustment of the lower guide bearing gap".

(4) For the main shaft upper guide bearing of the hydroelectric generator set, it is judged whether $CV^X<\beta$; if $CV^X<\beta$, step (5) is performed; otherwise, step (6) is performed. For the main shaft lower guide bearing of the hydroelectric generator set, it is judged whether $CV^Y<\beta$; if $CV^Y<\beta$, step (5) is performed; otherwise, step (6) is performed.

(5) Bearing temperature data $W_{Xt}$ and $W_{Yt}$ at the moment Ai when the maximum value of bearing swing data occurs are determined. It is judged whether $$\begin{cases} (\sigma + 1) < W_{Xt} \\ X_{Ai} < \omega \end{cases}.$$

If $$\begin{cases} (\sigma + 1) < W_{Xt} \\ X_{Ai} < \omega \end{cases},$$

the main shaft upper guide bearing state of the hydroelectric generator set is determined as "Excessively-small adjustment of the upper guide bearing gap"; otherwise, the main shaft upper guide bearing state of the hydroelectric generator set is determined as "Data abnormity, please check". It is judged whether $$\begin{cases} (\sigma + 1) < W_{Yt} \\ Y_{Ai} < \omega \end{cases}.$$

If $$\begin{cases} (\sigma + 1) < W_{Yt} \\ Y_{Ai} < \omega \end{cases},$$

the main shaft lower guide bearing state of the hydroelectric generator set is determined as "Excessively-small adjustment of the lower guide bearing gap"; otherwise, the main shaft lower guide bearing state of the hydroelectric generator set is determined as "Data abnormity, please check".

(6) The main shaft bearing state of the hydroelectric generator set is determined as "Uneven adjustment of the bearing gap".

For the preceding technical scheme, the definite value calculation and process-based evaluation effectively avoid a subjective and inaccurate evaluation result of the evaluation on the main shaft bearing state of the hydroelectric generator set based on experience. Through systematic language design, real-time monitoring and state evaluation are performed on the bearing state of the hydroelectric generator set so as to discover the abnormity of the bearing state timely, avoiding a delayed evaluation on the main shaft bearing state of the hydroelectric generator set.

Figure 4:
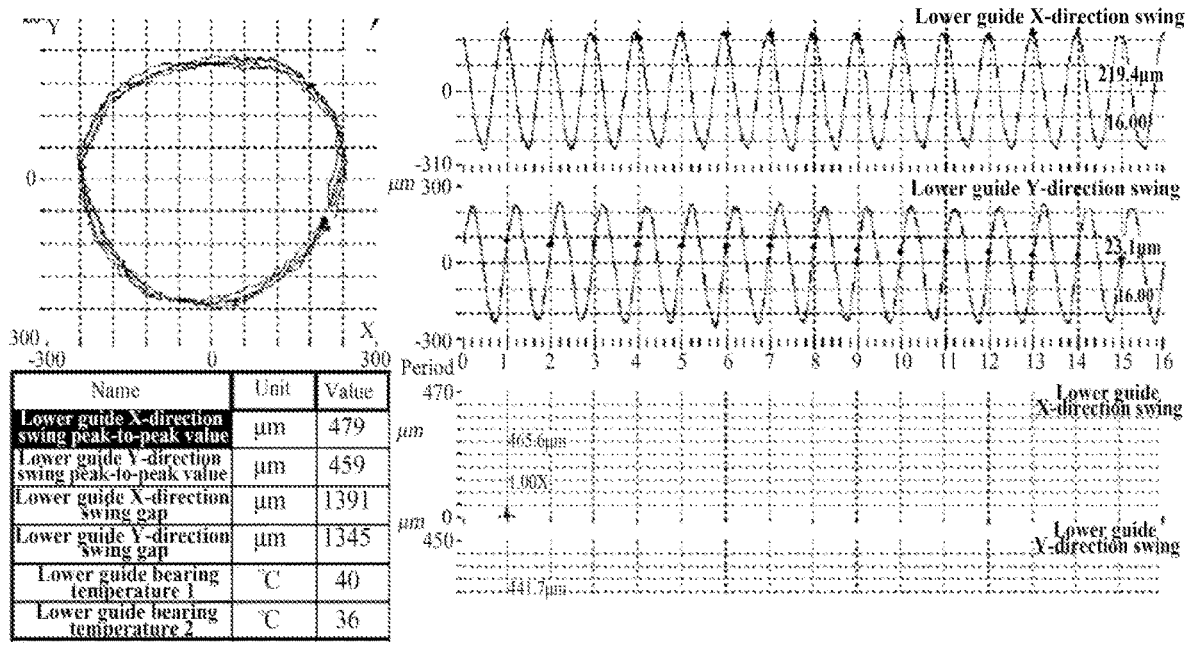
FIG. 4 is a diagram of a data monitoring interface for the excessively-large adjustment of a bearing gap of a hydroelectric generator set according to an embodiment of the present application.

Illustratively, FIG. 4 is a diagram of a data monitoring interface for the excessively-large adjustment of a bearing gap of a hydroelectric generator set according to an embodiment of the present application. It is assumed that the acquired bearing swing historical data and bearing temperature historical data of the main shaft bearing of the hydroelectric generator set are shown in Table 1 and the period self-abrupt change values obtained through calculation are shown in Table 2. Period mutual-comparison abrupt change values obtained through calculation are that $CV^X=0.72$, and $CV^Y=0.98$. In this case, the main shaft bearing state of the hydroelectric generator set is the state of the excessively-large adjustment of the bearing gap.

TABLE 1

Bearing swing data and bearing temperature data

| Moment | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|
| $X_t$ | 0 | 30.1 | 60.0 | 89.8 | 119.1 | 148.0 | 176.3 | 203.9 | 230.8 | 256.7 | 281.5 | 305.3 | 327.9 | 349.2 | 369.1 | 387.5 | ... |
| $Y_t$ | 0 | 28.8 | 57.5 | 86.0 | 114.1 | 141.8 | 169.0 | 195.4 | 221.1 | 245.9 | 269.8 | 292.6 | 314.2 | 334.6 | 353.7 | 371.3 | ... |
| $W_{Xt}$ | 37 | 36 | 36 | 36 | 36 | 36 | 37 | 37 | 37 | 37 | 37 | 40 | 40 | 40 | 37 | 37 | ... |
| $W_{Yt}$ | 36 | 36 | 36 | 36 | 36 | 36 | 36 | 36 | 37 | 37 | 37 | 40 | 40 | 40 | 40 | 37 | ... |

TABLE 2

Period self-abrupt change value

| Period | 1 | 2 | 3 |
|---|---|---|---|
| $SV_i^X$ | 0.01 | 0.015 | 0.017 |
| $SV_i^Y$ | 0.02 | 0.018 | 0.021 |

Figure 5:
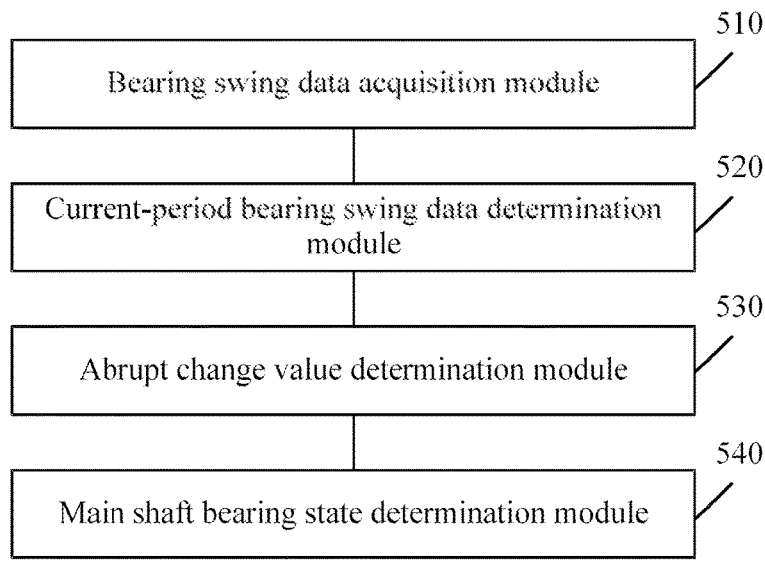
FIG. 5 is a diagram of a determination apparatus of a main shaft bearing state according to an embodiment of the present application.

FIG. 5 is a diagram of a determination apparatus of a main shaft bearing state according to an embodiment of the present application. As shown in FIG. 5, the apparatus includes a bearing swing data acquisition module 510, a current-period bearing swing data determination module 520, an abrupt change value determination module 530, and a main shaft bearing state determination module 540.

The bearing swing data acquisition module 510 is configured to acquire bearing swing data of a target main shaft bearing at a plurality of moments within a preset time period.

The current-period bearing swing data determination module 520 is configured to determine at least one current data period and current-period bearing swing data in each current data period according to the multiple pieces of bearing swing data.

The abrupt change value determination module 530 is configured to determine a first abrupt change value and a second abrupt change value according to the current-period bearing swing data in each current data period.

The main shaft bearing state determination module 540 is configured to determine a main shaft bearing state of the target main shaft bearing according to the first abrupt change value and the second abrupt change value.

The first abrupt change value is an abrupt change value between different current-period bearing swing data in each current data period. The second abrupt change value is an abrupt change value between current-period bearing swing data in different current data periods.

For the technical scheme in this embodiment, the bearing swing data of the target main shaft bearing at the plurality of moments within the preset time period are acquired. The at least one current data period and the current-period bearing swing data in each current data period are determined according to the bearing swing data. In this case, the first abrupt change value and the second abrupt change value are determined according to the current-period bearing swing data in each current data period. Therefore, the main shaft bearing state of the target main shaft bearing is determined according to the first abrupt change value and the second abrupt change value, avoiding the case of an inaccurate determination of the main shaft bearing state and a delayed discovery of abnormity in the related art, enabling the main shaft bearing state to be determined accurately and timely, and thereby improving the stability of a generator set.

For example, the abrupt change value determination module 530 may be configured to: determine, according to the current-period bearing swing data in each current data period, a first bearing swing data threshold and a second bearing swing data threshold that correspond to each current data period; determine, according to the first bearing swing data threshold and the second bearing swing data threshold that correspond to each current data period, the first abrupt change value corresponding to each current data period; and determine, according to the first bearing swing data threshold and the second bearing swing data threshold that correspond to each current data period, a second abrupt change value corresponding to all current data periods. The first bearing swing data threshold is the maximum value of the current-period bearing swing data. The second bearing swing data threshold is the minimum value of the current-period bearing swing data.

For example, the abrupt change value determination module 530 may be configured to: determine a current first threshold moment corresponding to a first bearing swing data threshold in a current data period; in the case where the current first threshold moment meets a current first preset condition, determine first abrupt change value calculation data and determine, according to the first abrupt change value calculation data, a first abrupt change value corresponding to the current data period; in the case where the current first threshold moment does not meet the current first preset condition, determine a current second threshold moment corresponding to a second bearing swing data threshold in the current data period; and in the case where the current second threshold moment meets a current second preset condition, determine second abrupt change value calculation data and determine, according to the second abrupt change value calculation data, the first abrupt change value corresponding to the current data period. The current first preset condition is determined according to the current data period, the current first threshold moment, and the data quantity of the current-period bearing swing data in the current data period. The current second preset condition is determined according to the current data period, the current second threshold moment, and the data quantity of current-period bearing swing data in the current data period.

For example, the abrupt change value determination module 530 may be configured to determine the total period number of current data periods and determine the second abrupt change value corresponding to all current data periods according to the total period number of current data periods as well as the first bearing swing data threshold and the second bearing swing data threshold that correspond to each current data period.

For example, the main shaft bearing state determination module 540 may be configured to: determine a threshold occurrence moment corresponding to each first bearing swing data threshold; acquire bearing temperature data of the target main shaft bearing at a plurality of moments within the preset time period and determine a bearing temperature data threshold according to each threshold occurrence moment and corresponding bearing temperature data; and determine the main shaft bearing state of the target main shaft bearing according to the first abrupt change value, the second abrupt change value, the bearing temperature data threshold, and the first bearing swing data threshold.

For example, the main shaft bearing state determination module 540 may be configured to: in the case of determining that the first abrupt change value meets a first abrupt change value preset threshold, determine a first preset threshold and determine, according to bearing temperature data threshold, the first bearing swing data threshold, and the first preset threshold, the main shaft bearing state of the target main shaft bearing; and in the case of determining that the first abrupt change value does not meet the first abrupt change value preset threshold and that the second abrupt change value meets a second abrupt change value preset threshold, determine a second preset threshold and determine, according to the bearing temperature data threshold, the first bearing swing data threshold, and the second preset threshold, the main shaft bearing state of the target main shaft bearing.

For example, the first preset threshold may include a first preset threshold condition of bearing temperature data and a first preset threshold of bearing swing data. Correspondingly, the main shaft bearing state determination module 540 may be configured to: in the case of determining that the bearing temperature data threshold meets the first preset threshold condition of bearing temperature data and the first bearing swing data threshold meets the first preset threshold of bearing swing data, determine that the main shaft bearing state of the target main shaft bearing is a state of the normal adjustment of a bearing gap; and in the case of determining that the bearing temperature data threshold does not meet the first preset threshold condition of bearing temperature data or that the first bearing swing data threshold does not meet the first preset threshold of bearing swing data, determine that the main shaft bearing state of the target main shaft bearing is a state of the excessively-large adjustment of the bearing gap.

For example, the second preset threshold may include a second preset threshold condition of bearing temperature data and a second preset threshold of bearing swing data. Correspondingly, the main shaft bearing state determination module 540 may be configured to, in the case of determining that the bearing temperature data threshold meets the second preset threshold condition of bearing temperature data and that the first bearing swing data threshold meets the second preset threshold of bearing swing data, determine that the main shaft bearing state of the target main shaft bearing is a state of the excessively-small adjustment of the bearing gap.

For example, the main shaft bearing state determination module 540 may be further configured to, in the case of determining that the first abrupt change value does not meet the first abrupt change value preset threshold and that the second abrupt change value does not meet the second abrupt change value preset threshold, determine that the main shaft bearing state of the target main shaft bearing is a state of the uneven adjustment of the bearing gap.

The determination apparatus of a main shaft bearing state according to this embodiment of the present application may perform the determination method of a main shaft bearing state according to any embodiment of the present application and has functional modules and beneficial effects corresponding to the performed method.

Figure 6:
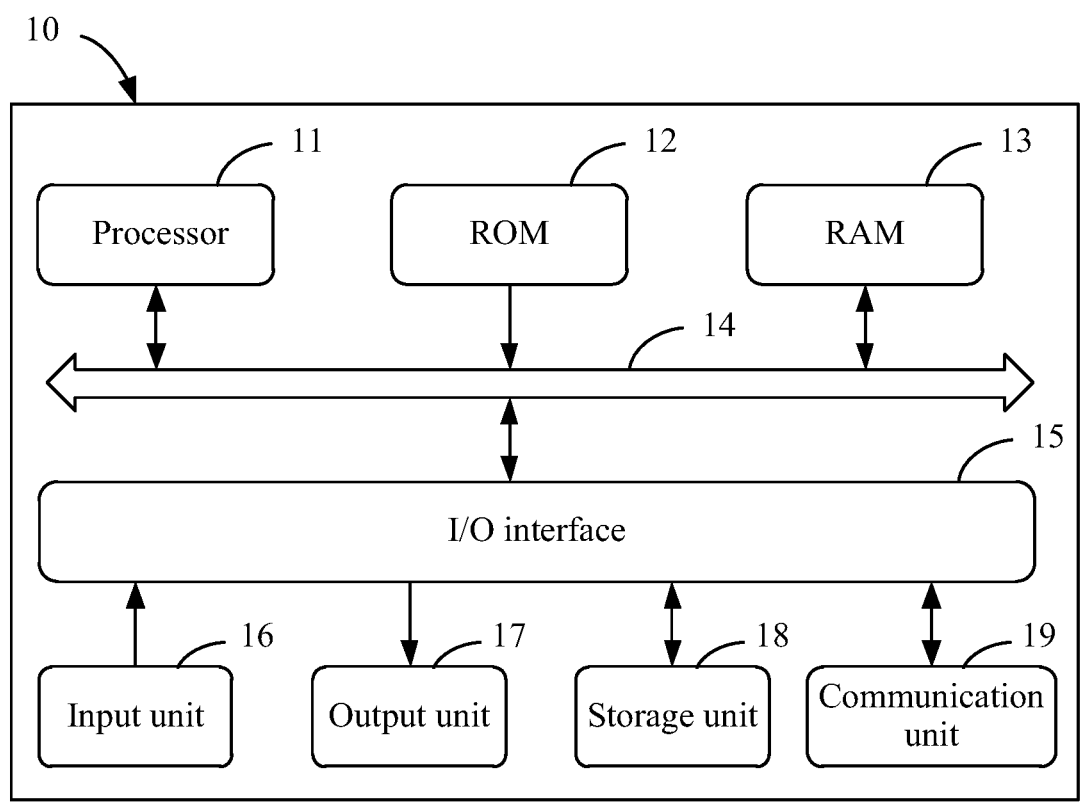
FIG. 6 is a structural diagram of an electronic device for implementing a determination method of a main shaft bearing state according to an embodiment of the present application.

FIG. 6 is a structural diagram of an electronic device 10 for implementing embodiments of the present application. The electronic device is intended to represent various forms of digital computers, for example, laptop computers, desktop computers, worktables, personal digital assistants, servers, blade servers, mainframe computers, or other applicable computers. The electronic device may also represent various forms of mobile apparatuses, for example, a personal digital assistant, a cellphone, a smartphone, a wearable device (such as a helmet, glasses, and a watch), or a similar computing apparatus. Herein the shown components, the connections and relationships between these components, and the functions of these components are merely illustrative and are not intended to limit the implementation of the present application as described and/or claimed herein.

As shown in FIG. 6, the electronic device 10 includes at least one processor 11 and a memory (such as a read-only memory (ROM) 12 and a random-access memory (RAM) 13) communicatively connected to the at least one processor 11. The memory stores a computer program executable by the at least one processor. The processor 11 may perform various types of appropriate operations and processing according to a computer program stored in the ROM 12 or a computer program loaded from a storage unit 18 to the RAM 13. The RAM 13 may also store various programs and data required for the operation of the electronic device 10. The processor 11, the ROM 12, and the RAM 13 are connected to each other through a bus 14. An input/output (I/O) interface 15 is also connected to the bus 14.

Multiple components in the electronic device 10 are connected to the I/O interface 15. The multiple components include an input unit 16 such as a keyboard and a mouse, an output unit 17 such as various types of displays and speakers, the storage unit 18 such as a magnetic disk and an optical disk, and a communication unit 19 such as a network card, a modem and a wireless communication transceiver. The communication unit 19 allows the electronic device 10 to exchange information/data with other devices over a computer network such as the Internet and/or various telecommunications networks.

The processor 11 may be various general-purpose and/or special-purpose processing components having processing and computing capabilities. Examples of the processor 11 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller and microcontroller. The at least one processor 11 performs various preceding methods and processing, such as the determination method of a main shaft bearing state.

In some examples, the determination method of a main shaft bearing state may be implemented as computer programs tangibly contained in a computer-readable storage medium such as the storage unit 18. In some embodiments, part or all of computer programs may be loaded and/or installed onto the electronic device 10 via the ROM 12 and/or the communication unit 19. When the computer programs are loaded to the RAM 13 and executed by the processor 11, one or more steps of the preceding determination method of a main shaft bearing state may be performed. Alternatively, in other embodiments, the processor 11 may be configured, in any other suitable manner (for example, by means of firmware), to perform the determination method of a main shaft bearing state. The computer-readable storage medium may be a non-transitory computer-readable storage medium.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present application may be written in one programming language or any combination of multiple programming languages. These computer programs may be provided for a processor of a general-purpose computer, a special-purpose computer or another programmable data processing apparatus such that the computer programs, when executed by the processor, cause functions/operations specified in the flowcharts and/or block diagrams to be implemented. The computer programs may be executed entirely on a machine, partly on a machine, as a stand-alone software package, partly on a machine and partly on a remote machine, or entirely on a remote machine or a server.

In the context of the present application, the computer-readable storage medium may be a tangible medium including or storing a computer program that is used by or used in conjunction with an instruction execution system, apparatus, or device. The computer-readable storage medium may include, but is not limited to, an electronic, magnetic, optical, electromagnetic, infrared or semiconductor system, apparatus or device, or any suitable combination thereof. Alternatively, the computer-readable storage medium may be a machine-readable signal medium. More specific examples of the machine-readable storage medium may include an electrical connection with one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof.

In order that interaction with a user is provided, the systems and techniques described herein may be implemented on the electronic device. The electronic device has a display device (for example, a cathode-ray tube (CRT) or a liquid-crystal display (LCD) monitor) for displaying information to the user, and a keyboard and a pointing device (for example, a mouse or a trackball) through which the user can provide input for the electronic device. Other types of apparatus may also be used for providing interaction with a user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user may interact with embodiments of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

The computing system may include a client and a server. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, so as to avoid the case of difficult management and weak service scalability in a physical host and a related virtual private server (VPS) service in the related art.

It is to be understood that various forms of the preceding flows may be used with steps reordered, added, or removed. For example, the steps described in the present application may be executed in parallel, in sequence or in a different order as long as the desired results of the technical schemes provided in the present application are achieved. The execution sequence of these steps is not limited herein.

What is claimed is:

1. A determination method of a main shaft bearing state, comprising:
    measuring and acquiring a plurality of pieces of swing data of a target main shaft bearing at a plurality of moments within a preset time period, wherein the plurality of pieces of swing data are swing data of the target main shaft bearing collected by a sensor connected to the target main shaft bearing and are used for determining current-period swing data in each of current data periods;
    determining the current data periods and the current-period swing data in each of the current data periods according to the plurality of pieces of swing data;
    determining, according to the current-period swing data in each of the current data periods, a first swing data threshold and a second swing data threshold that correspond to each of the current data periods;
    for each of the current data periods, determining, according to the first swing data threshold and the second swing data threshold that correspond to the respective current data period, a first abrupt change value corresponding to the respective current data period;
determining, according to the first swing data threshold and the second swing data threshold that correspond to each of the current data periods, a second abrupt change value corresponding to all the current data periods, wherein the first swing data threshold is a maximum value of the current-period swing data, and the second swing data threshold is a minimum value of the current-period swing data;
determining a threshold occurrence moment corresponding to each first swing data threshold;
acquiring bearing temperature data of the target main shaft bearing at the plurality of moments within the preset time period, and determining a bearing temperature data threshold according to each of the threshold occurrence moments and bearing temperature data corresponding to each of the threshold occurrence moments, wherein the bearing temperature data are temperature data of the target main shaft bearing collected by a temperature sensor connected to the target main shaft bearing and are used for determining the main shaft bearing state of the target main shaft bearing;
in response to determining that the first abrupt change value meets a first abrupt change value preset threshold, determining a first preset threshold, and determining the main shaft bearing state of the target main shaft bearing as a state of excessively-large adjustment of a bearing gap or a state of normal adjustment of the bearing gap according to the bearing temperature data threshold, the first swing data threshold, and the first preset threshold;
in response to determining that the first abrupt change value does not meet the first abrupt change value preset threshold and that the second abrupt change value meets a second abrupt change value preset threshold, determining a second preset threshold, and determining the main shaft bearing state of the target main shaft bearing as a state of excessively-small adjustment of the bearing gap according to the bearing temperature data threshold, the first swing data threshold, and the second preset threshold;
in response to determining that the first abrupt change value does not meet the first abrupt change value preset threshold and that the second abrupt change value does not meet the second abrupt change value preset threshold, determining the main shaft bearing state of the target main shaft bearing as a state of uneven adjustment of the bearing gap; and
outputting and recording the main shaft bearing state of the target main shaft bearing.

2. The method according to claim 1, wherein determining, according to the first swing data threshold and the second swing data threshold that correspond to each of the current data periods, the first abrupt change value corresponding to each of the current data periods comprises:
determining a current first threshold moment corresponding to the first swing data threshold in a current data period of the current data periods;
in response to determining that the current first threshold moment meets a current first preset condition, determining first abrupt change value calculation data, and determining, according to the first abrupt change value calculation data, the first abrupt change value corresponding to the current data period;

in response to determining that the current first threshold moment does not meet the current first preset condition, determining a current second threshold moment corresponding to the second swing data threshold in the current data period; and
in response to determining that the current second threshold moment meets a current second preset condition, determining second abrupt change value calculation data, and determining, according to the second abrupt change value calculation data, the first abrupt change value corresponding to the current data period,
wherein the current first preset condition is determined according to the current data period, the current first threshold moment, and a data quantity of the current-period swing data in the current data period; and
the current second preset condition is determined according to the current data period, the current second threshold moment, and the data quantity of the current-period swing data in the current data period.

3. The method according to claim 1, wherein determining, according to the first swing data threshold and the second swing data threshold that correspond to each of the current data periods, the second abrupt change value corresponding to all the current data periods comprises:
determining a total period number of the current data periods; and
determining, according to the total period number of the current data periods, and the first swing data threshold and the second swing data threshold that correspond to each of the current data periods, the second abrupt change value corresponding to all the current data periods.

4. The method according to claim 1, wherein the first preset threshold comprises a first preset threshold condition of bearing temperature data and a first preset threshold of swing data; and
determining the main shaft bearing state of the target main shaft bearing according to the bearing temperature data threshold, the first swing data threshold, and the first preset threshold comprises:
in response to determining that the bearing temperature data threshold meets the first preset threshold condition of bearing temperature data and that the first swing data threshold meets the first preset threshold of swing data, determining that the main shaft bearing state is the state of normal adjustment of the bearing gap; and
in response to determining that the bearing temperature data threshold does not meet the first preset threshold condition of bearing temperature data or that the first swing data threshold does not meet the first preset threshold of swing data, determining that the main shaft bearing state is the state of excessively-large adjustment of the bearing gap.

5. The method according to claim 1, wherein the second preset threshold comprises a second preset threshold condition of bearing temperature data and a second preset threshold of swing data; and
determining the main shaft bearing state of the target main shaft bearing according to the bearing temperature data threshold, the first swing data threshold, and the second preset threshold comprises:
in response to determining that the bearing temperature data threshold meets the second preset threshold condition of bearing temperature data and that the first swing data threshold meets the second preset threshold of swing data, determining that the main shaft bearing state is the state of excessively-small adjustment of the bearing gap.

6. An electronic device, comprising:
at least one processor; and
a memory communicatively connected to the at least one processor,
wherein the memory stores computer instructions executable by the at least one processor, and the computer instructions are executed by the at least one processor to cause the at least one processor to perform the following:
measuring and acquiring a plurality of pieces of swing data of a target main shaft bearing at a plurality of moments within a preset time period, wherein the plurality of pieces of swing data are swing data of the target main shaft bearing collected by a sensor connected to the target main shaft bearing and are used for determining current-period swing data in each of current data periods;
determining the current data periods and the current-period swing data in each of the current data periods according to the plurality of pieces of swing data;
determining, according to the current-period swing data in each of the current data periods, a first swing data threshold and a second swing data threshold that correspond to each of the current data periods;
for each of the current data periods, determining, according to the first swing data threshold and the second swing data threshold that correspond to the respective current data period, a first abrupt change value corresponding to the respective current data period;
determining, according to the first swing data threshold and the second swing data threshold that correspond to each of the current data periods, a second abrupt change value corresponding to all the current data periods, wherein the first swing data threshold is a maximum value of the current-period swing data, and the second swing data threshold is a minimum value of the current-period swing data;
determining a threshold occurrence moment corresponding to each first swing data threshold;
acquiring bearing temperature data of the target main shaft bearing at the plurality of moments within the preset time period, and determining a bearing temperature data threshold according to each of the threshold occurrence moments and bearing temperature data corresponding to each of the threshold occurrence moments, wherein the bearing temperature data are temperature data of the target main shaft bearing collected by a temperature sensor connected to the target main shaft bearing and are used for determining a main shaft bearing state of the target main shaft bearing;
in response to determining that the first abrupt change value meets a first abrupt change value preset threshold, determining a first preset threshold, and determining the main shaft bearing state of the target main shaft bearing as a state of excessively-large adjustment of a bearing gap or a state of normal adjustment of the bearing gap according to the bearing temperature data threshold, the first swing data threshold, and the first preset threshold;
in response to determining that the first abrupt change value does not meet the first abrupt change value preset threshold and that the second abrupt change value meets a second abrupt change value preset threshold, determining a second preset threshold, and determining the main shaft bearing state of the target main shaft bearing as a state of excessively-small adjustment of the bearing gap according to the bearing temperature data threshold, the first swing data threshold, and the second preset threshold;
in response to determining that the first abrupt change value does not meet the first abrupt change value preset threshold and that the second abrupt change value does not meet the second abrupt change value preset threshold, determining the main shaft bearing state of the target main shaft bearing as a state of uneven adjustment of the bearing gap; and
outputting and recording the main shaft bearing state of the target main shaft bearing.

7. The electronic device according to claim 6,
wherein the computer instructions are executed by the at least one processor to cause the at least one processor to perform determining, according to the first swing data threshold and the second swing data threshold that correspond to each of the current data periods, the first abrupt change value corresponding to each of the current data periods by:
determining a current first threshold moment corresponding to the first swing data threshold in a current data period of the current data periods;
in response to determining that the current first threshold moment meets a current first preset condition, determining first abrupt change value calculation data, and determining, according to the first abrupt change value calculation data, the first abrupt change value corresponding to the current data period;
in response to determining that the current first threshold moment does not meet the current first preset condition, determining a current second threshold moment corresponding to the second swing data threshold in the current data period; and
in response to determining that the current second threshold moment meets a current second preset condition, determining second abrupt change value calculation data, and determining, according to the second abrupt change value calculation data, the first abrupt change value corresponding to the current data period,
wherein the current first preset condition is determined according to the current data period, the current first threshold moment, and a data quantity of the current-period swing data in the current data period; and
the current second preset condition is determined according to the current data period, the current second threshold moment, and the data quantity of the current-period swing data in the current data period.

8. The electronic device according to claim 6,
wherein the computer instructions are executed by the at least one processor to cause the at least one processor to perform determining, according to the first swing data threshold and the second swing data threshold that correspond to each of the current data periods, the second abrupt change value corresponding to all the current data periods by:
determining a total period number of the current data periods; and
determining, according to the total period number of the current data periods, and the first swing data threshold and the second swing data threshold that correspond to each of the current data periods, the second abrupt change value corresponding to all the current data periods.

9. The electronic device according to claim 6,
wherein the first preset threshold comprises a first preset threshold condition of bearing temperature data and a first preset threshold of swing data; and the computer instructions are executed by the at least one processor to cause the at least one processor to perform determining the main shaft bearing state of the target main shaft bearing according to the bearing temperature data threshold, the first swing data threshold, and the first preset threshold by:
in response to determining that the bearing temperature data threshold meets the first preset threshold condition of bearing temperature data and that the first swing data threshold meets the first preset threshold of swing data, determining that the main shaft bearing state is the state of normal adjustment of the bearing gap; and
in response to determining that the bearing temperature data threshold does not meet the first preset threshold condition of bearing temperature data or that the first swing data threshold does not meet the first preset threshold of swing data, determining that the main shaft bearing state is the state of excessively-large adjustment of the bearing gap.

10. The electronic device according to claim 6,
wherein the second preset threshold comprises a second preset threshold condition of bearing temperature data and a second preset threshold of swing data; and the computer instructions are executed by the at least one processor to cause the at least one processor to perform determining the main shaft bearing state of the target main shaft bearing according to the bearing temperature data threshold, the first swing data threshold, and the second preset threshold by:
in response to determining that the bearing temperature data threshold meets the second preset threshold condition of bearing temperature data and that the first swing data threshold meets the second preset threshold of swing data, determining that the main shaft bearing state is the state of excessively-small adjustment of the bearing gap.

11. A non-transitory computer-readable storage medium for storing computer instructions, wherein the computer instructions, when executed by a processor, are configured to implement the following:
measuring and acquiring a plurality of pieces of swing data of a target main shaft bearing at a plurality of moments within a preset time period, wherein the plurality of pieces of swing data are swing data of the target main shaft bearing collected by a sensor connected to the target main shaft bearing and are used for determining current-period swing data in each of current data periods;
determining the current data periods and the current-period swing data in each of the current data periods according to the plurality of pieces of swing data;
determining, according to the current-period swing data in each of the current data periods, a first swing data threshold and a second swing data threshold that correspond to each of the current data periods;
for each of the current data periods, determining, according to the first swing data threshold and the second swing data threshold that correspond to the respective current data period, a first abrupt change value corresponding to the respective current data period;
determining, according to the first swing data threshold and the second swing data threshold that correspond to each of the current data periods, a second abrupt change value corresponding to all the current data periods, wherein the first swing data threshold is a maximum value of the current-period swing data, and the second swing data threshold is a minimum value of the current-period swing data;
determining a threshold occurrence moment corresponding to each first swing data threshold;
acquiring bearing temperature data of the target main shaft bearing at the plurality of moments within the preset time period, and determining a bearing temperature data threshold according to each of the threshold occurrence moments and bearing temperature data corresponding to each of the threshold occurrence moments, wherein the bearing temperature data are temperature data of the target main shaft bearing collected by a temperature sensor connected to the target main shaft bearing and are used for determining a main shaft bearing state of the target main shaft bearing;
in response to determining that the first abrupt change value meets a first abrupt change value preset threshold, determining a first preset threshold, and determining the main shaft bearing state of the target main shaft bearing as a state of excessively-large adjustment of a bearing gap or a state of normal adjustment of the bearing gap according to the bearing temperature data threshold, the first swing data threshold, and the first preset threshold;
in response to determining that the first abrupt change value does not meet the first abrupt change value preset threshold and that the second abrupt change value meets a second abrupt change value preset threshold, determining a second preset threshold, and determining the main shaft bearing state of the target main shaft bearing as a state of excessively-small adjustment of the bearing gap according to the bearing temperature data threshold, the first swing data threshold, and the second preset threshold;
in response to determining that the first abrupt change value does not meet the first abrupt change value preset threshold and that the second abrupt change value does not meet the second abrupt change value preset threshold, determining the main shaft bearing state of the target main shaft bearing as a state of uneven adjustment of the bearing gap; and
outputting and recording the main shaft bearing state of the target main shaft bearing.

12. The non-transitory computer-readable storage medium according to claim 11, wherein the computer instructions, when executed by the processor, are configured to implement determining, according to the first swing data threshold and the second swing data threshold that correspond to each of the current data periods, the first abrupt change value corresponding to each of the current data periods by:
determining a current first threshold moment corresponding to the first swing data threshold in a current data period of the current data periods;
in response to determining that the current first threshold moment meets a current first preset condition, determining first abrupt change value calculation data, and determining, according to the first abrupt change value calculation data, the first abrupt change value corresponding to the current data period;
in response to determining that the current first threshold moment does not meet the current first preset condition, determining a current second threshold moment corresponding to the second swing data threshold in the current data period; and in response to determining that the current second threshold moment meets a current second preset condition, determining second abrupt change value calculation data, and determining, according to the second abrupt change value calculation data, the first abrupt change value corresponding to the current data period, wherein the current first preset condition is determined according to the current data period, the current first threshold moment, and a data quantity of the current-period swing data in the current data period; and the current second preset condition is determined according to the current data period, the current second threshold moment, and the data quantity of the current-period swing data in the current data period.

13. The non-transitory computer-readable storage medium according to claim 11, wherein the computer instructions, when executed by the processor, are configured to implement determining, according to the first swing data threshold and the second swing data threshold that correspond to each of the current data periods, the second abrupt change value corresponding to all the current data periods by:

determining a total period number of the current data periods; and determining, according to the total period number of the current data periods, and the first swing data threshold and the second swing data threshold that correspond to each of the current data periods, the second abrupt change value corresponding to all the current data periods.

14. The non-transitory computer-readable storage medium according to claim 11, wherein the first preset threshold comprises a first preset threshold condition of bearing temperature data and a first preset threshold of swing data; and the computer instructions, when executed by the processor, are configured to implement determining the main shaft bearing state of the target main shaft bearing according to the bearing temperature data threshold, the first swing data threshold, and the first preset threshold by:

in response to determining that the bearing temperature data threshold meets the first preset threshold condition of bearing temperature data and that the first swing data threshold meets the first preset threshold of swing data, determining that the main shaft bearing state is the state of normal adjustment of the bearing gap; and in response to determining that the bearing temperature data threshold does not meet the first preset threshold condition of bearing temperature data or that the first swing data threshold does not meet the first preset threshold of swing data, determining that the main shaft bearing state is the state of excessively-large adjustment of the bearing gap.

15. The non-transitory computer-readable storage medium according to claim 11, wherein the second preset threshold comprises a second preset threshold condition of bearing temperature data and a second preset threshold of swing data; and the computer instructions, when executed by the processor, are configured to implement determining the main shaft bearing state of the target main shaft bearing according to the bearing temperature data threshold, the first swing data threshold, and the second preset threshold by:

in response to determining that the bearing temperature data threshold meets the second preset threshold condition of bearing temperature data and that the first swing data threshold meets the second preset threshold of swing data, determining that the main shaft bearing state is the state of excessively-small adjustment of the bearing gap.

* * * * *